United States Patent [19]

Hedlund et al.

[11] Patent Number: 4,505,396

[45] Date of Patent: Mar. 19, 1985

[54] WHEELED WORKING VEHICLE WITH CRANE

[75] Inventors: Bo P. S. Hedlund; Eric Arnoldsson, both of Söderhamn, Sweden

[73] Assignee: Kockums Industri AB, Söderhamn, Sweden

[21] Appl. No.: 354,957

[22] Filed: Mar. 5, 1982

[30] Foreign Application Priority Data

Mar. 13, 1981 [SE] Sweden .............................. 8101625

[51] Int. Cl.³ ........................................... B66C 23/36
[52] U.S. Cl. .................................. 212/223; 212/246; 212/248; 212/254; 414/473; 280/492; 180/89.13
[58] Field of Search ............... 212/165, 195, 223, 245, 212/248, 254, 271, 238; 180/89.13; 414/467, 473, 474, 482, 483, 495, 496, 542; 280/492

[56] References Cited

U.S. PATENT DOCUMENTS

| | | | |
|---|---|---|---|
| 1,405,159 | 1/1922 | Polaski et al. | 180/266 |
| 2,461,877 | 2/1949 | Brereton | 212/247 |
| 2,675,927 | 4/1954 | Tourneau | 212/244 |
| 3,042,233 | 7/1962 | Wills | 212/245 |
| 3,398,984 | 8/1968 | Ajero | 180/89.13 |
| 3,601,169 | 8/1971 | Hamilton et al. | 212/238 |
| 3,680,720 | 8/1972 | Strange | 212/244 |
| 3,807,586 | 4/1974 | Holopainen | 180/265 |
| 3,963,132 | 6/1976 | Dufour | 180/89.13 |
| 4,053,061 | 10/1977 | Lester | 212/165 |
| 4,079,955 | 3/1978 | Thorpe et al. | 280/492 |
| 4,126,198 | 11/1978 | Martin | 180/89.13 |
| 4,200,315 | 4/1980 | Carlsson | 280/492 |
| 4,310,098 | 1/1982 | Dirksen | 212/265 |
| 4,350,190 | 9/1982 | McColl | 180/89.13 |

Primary Examiner—Trygve M. Blix
Assistant Examiner—Stephen P. Avila
Attorney, Agent, or Firm—Stevens, Davis, Miller & Mosher

[57] ABSTRACT

In a working vehicle including a crane (21) for handling loads and a driver's cab (11), both crane and cab are rotatably mounted on the vehicle, each about its vertical axis, and controlled such that a turning angle $\beta$ of the crane results in a turning angle $\alpha$ of the cab, $\alpha$ being an optional function of $\beta$, e.g. half of $\beta$. The driver can thus carry out all the working operations desired for the crane without having to turn his head uncomfortably.

10 Claims, 7 Drawing Figures

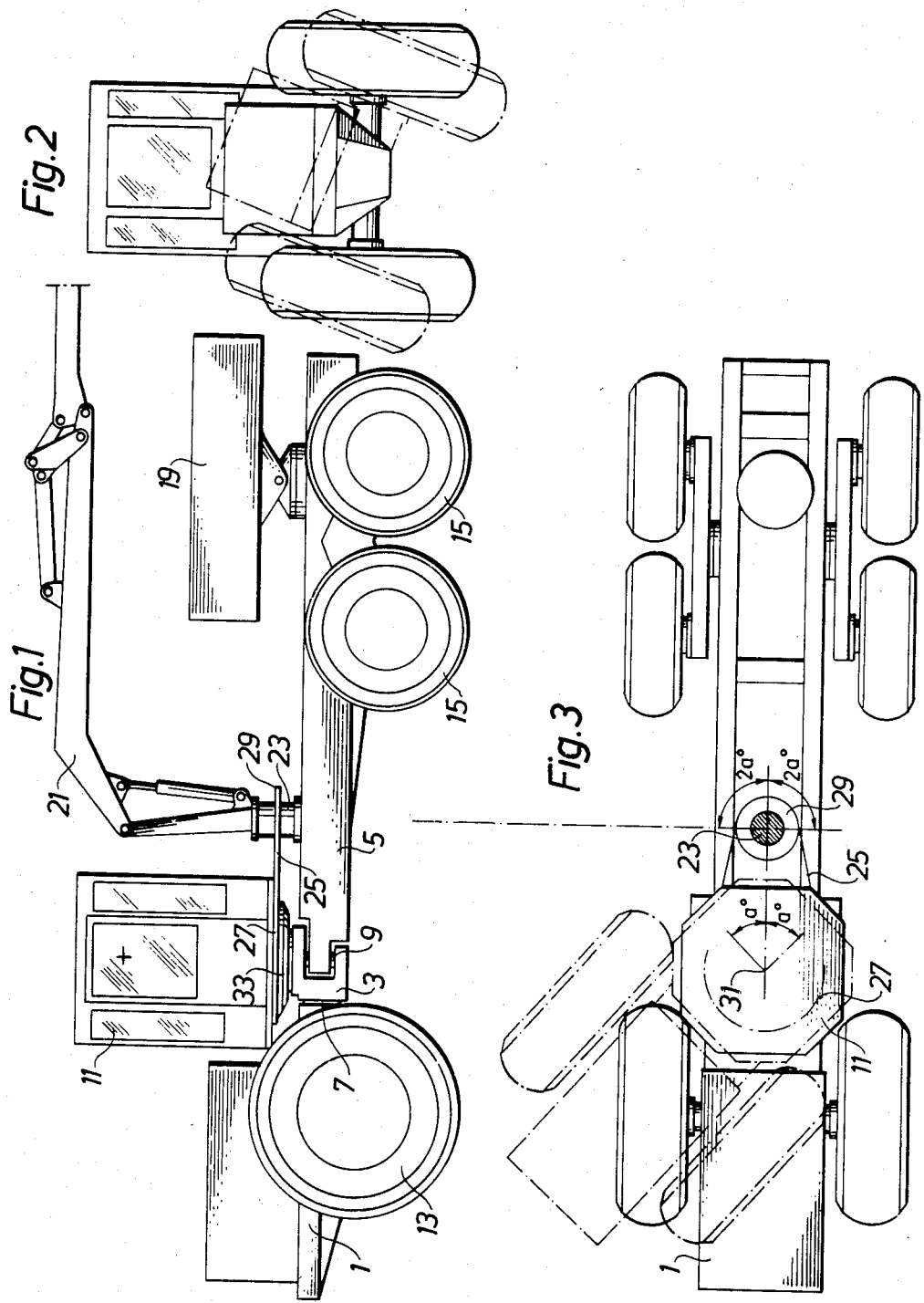

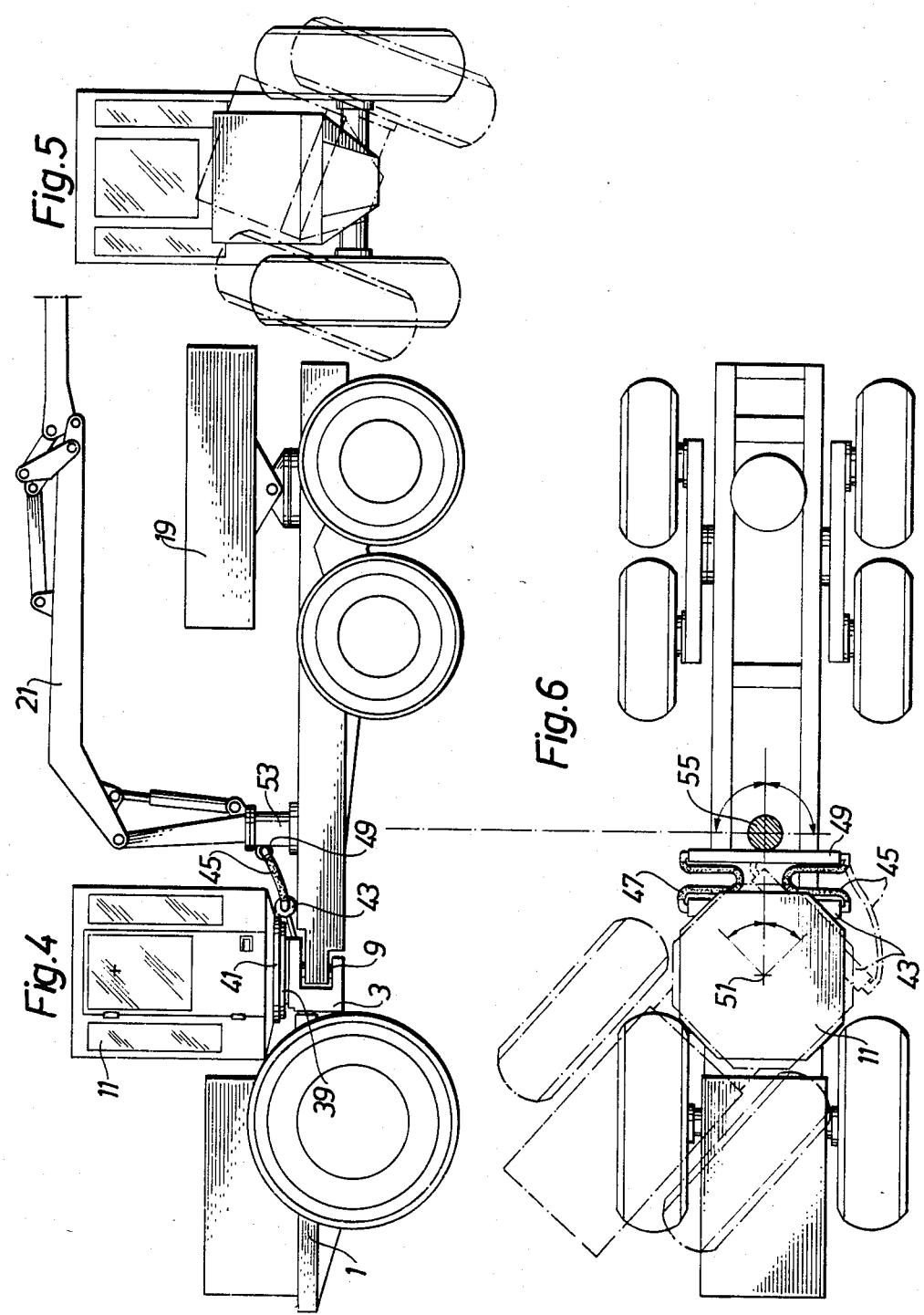

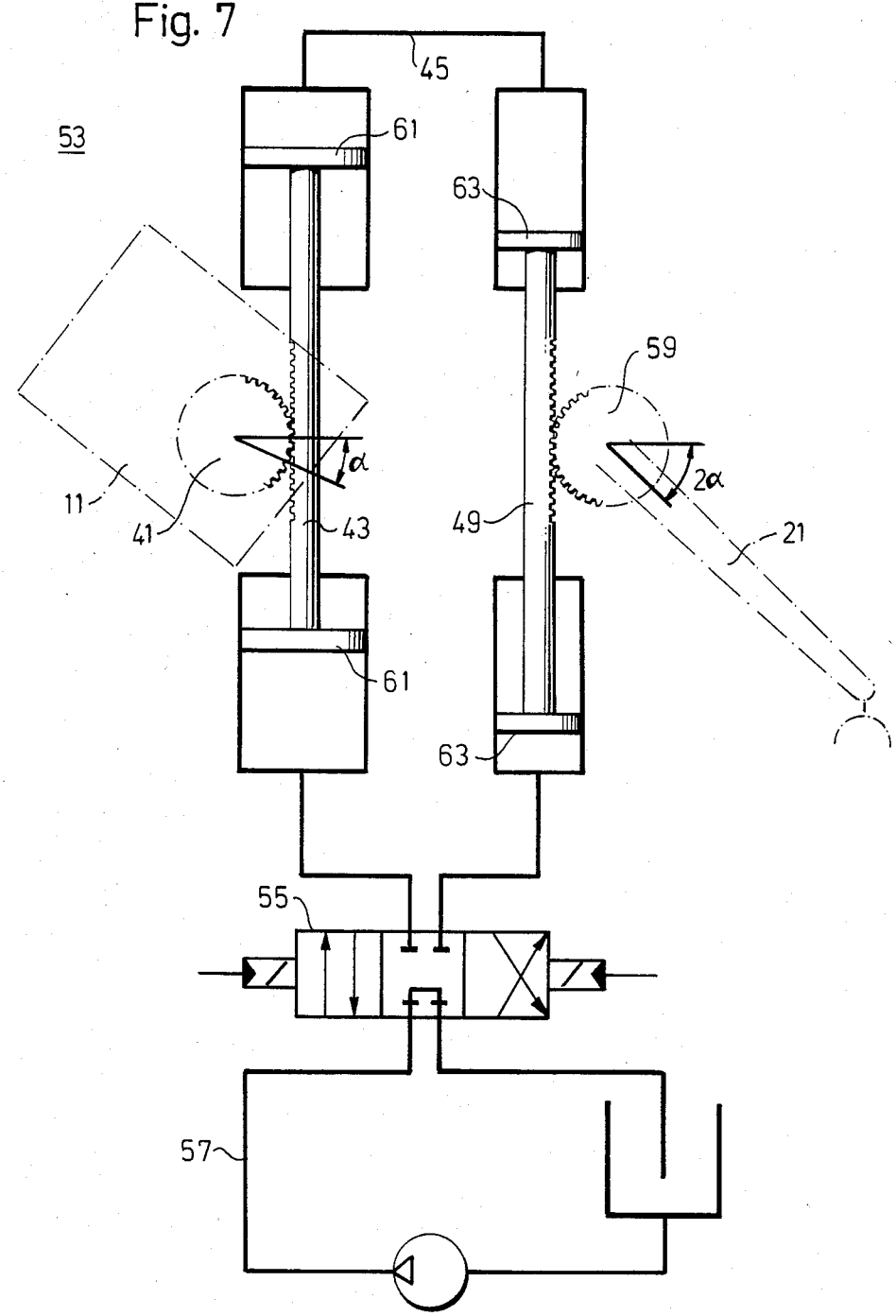

WHEELED WORKING VEHICLE WITH CRANE

BACKGROUND OF THE INVENTION

The present invention relates to wheeled working vehicles, especially forestry machines, with a crane rotatable in the horizontal plane. The vehicle is provided with a driver's cab from which the crane is operated by conventional steering means. As a rule, the cab is rigidly mounted on the vehicle and on the forward section thereof in waist articulated vehicles.

In working with such a machine, which is here assumed to be a forestry machine for delimbing or trimming and possible further processing of the trees, the machine is usually set up such that the driver has the crane directly behind him in relation to the travelling direction of the vehicle, and for work with the crane the driver turns so that he is facing directly backwards in respect of the travelling direction of the vehicle, thus having the crane and other processing units, e.g. a trimming unit, directly in front of him. The trees to be processed are generally placed to one side of the vehicle, and in many cases the driver must turn the crane a very large angle to collect the tree for subsequently feeding it to the processing unit. The driver must then turn his head to one side a considerable angle each time for being able to control the function of the crane and its gripping means. This working attitude is very uncomfortable.

The object of the present invention is to provide a working vehicle of the kind mentioned above, in which the driver does not need to turn his head in an uncomfortable manner when operating the crane. In its preferred embodiment, the invention enables the driver to refrain from turning his head when collecting trees at normal working distances from the vehicle and feeding them to the processing unit.

SUMMARY OF THE INVENTION

A vehicle in accordance with the invention is characterized in that the driver's cab is rotatably mounted on the vehicle about a substantially vertical axis and for rotation is adapted to be controlled such that turning the crane an angle $\beta$ results in turning the cab an angle $\alpha$ in the rotational direction of the crane, where $\alpha$ is less than, greater than or equal to $\beta$.

In a case selected as a suitable example, the rotation of the cab is adapted so that $\alpha$ is approximately equal to $\beta$.

The above-mentioned control of the cab and crane can take place in different modes. In the present application, two of these modes are dealt with, namely (a) the coupling of crane and cab by means of a chain transmission with the desired gear ratio and (b) the use of mechanical-hydraulic means suitably mutually adapted for the desired angular control of the crane and cab.

BRIEF DESCRIPTION OF THE DRAWINGS

FIG. 1 is a side elevational view of the wheeled crane vehicle of this invention, with a chain transmission between the cab and the crane;

FIG. 2 is a front view of the embodiment of FIG. 1 showing in dotted lines the longitudinal articulation thereof;

FIG. 3 is a top view of the embodiment of FIG. 1 showing the horizontal articulation thereof;

FIG. 4 is a side elevational view of a second embodiment;

FIG. 5 is a front view similar to FIG. 2;

FIG. 6 is a top view similar to FIG. 3;

FIG. 7 is a schematic view showing hydraulically actuated racks and pinions for rotating the cab and crane.

DESCRIPTION OF THE PREFERRED EMBODIMENT

The machine according to FIGS. 1-3 is constructed on a carrying vehicle of the articulated waist type, and has a forward section 1 with carrying wheels 13 and a rear section 5 with carrying wheels 15. In particular construction illustrated on the drawing, the forward section 1 and rear section 5 are connected together by means of an intermediate section 3, on which the cab 11 is mounted. The intermediate section is articulatedly connected to the forward section 1 by means of a horizontal shaft 7 in the longitudinal direction of the vehicle, and articulatedly connected to the rear section 5 by means of a vertical pin 9.

The cab 11 is carried on the intermediate section 3, and is rotatably mounted about a vertical axis 31 by means of a bearing 33, e.g. a slewing bearing. The rotational axis 31 of the cab is coincidental with the axis of the vertical articulating pin 9, which is a prerequisite for the application of chain transmission for turning the cab 11 and crane 21. The turning in question is provided by a chainwheel 27 fixed in relation to the cab 11, a chainwheel 29 fixed in relation to the crane 21 and a chain 25. The crane mounting on the vehicle chassis is denoted by the numeral 23 and by 19 is denoted a processing unit for the trees, e.g. a trimming unit.

In FIG. 3, the vehicle is shown set up in a position where the forward section 1 is directed forwards in the travelling direction of the vehicle, chain dotted lines illustrating a set-up with the forward section pointing off to the right. In both these positions the cab 11 is illustrated as positioned in the direction of the forward section, i.e. in the initial position of the cab before operating the crane.

In this embodiment, the diameter of the chainwheel 29 is less than the diameter of the chainwheel 27 such that turning the crane an angle $2\alpha$ results in turning the cab an angle $\alpha$ in the same direction. This selection of the relative turning angles is advantageous, since the driver can always be facing a direction halfway between the direction from the cab to the processing unit 19 and the direction from the cab to the gripping means on the crane. This results in the advantage that the driver has the entire working area in his field of view the whole time, so that in practice he seldom needs to turn his head to control the different functions.

An alternative embodiment is illustrated in FIGS. 4-7, in which turning the cab 11 and crane 21 is effected with the aid of mechanical-hydraulic means 53, 55 and 57 including a hydraulic piston-cylinder unit 53 having a rack 43,49 arranged to be is mesh with, and drive pinions 41,59 mounted on the cab and crane respectively. Such means are known per se, and are used for different purposes. By selecting mechanical-hydraulic means with different piston diameters 61,63 for driving the cab and crane, respectively, the desired turning relationship between these can be carried out in a simple way by supplying hydraulic pressure medium to said means in such circuitry that both means are driven with the same flow volume, which simplifies the construction.

The mechanical-hydraulic driving means for the cab and crane are denoted by 43 and 49, respectively, in FIGS. 4-6 and the hydraulic hoses by 45. The driving means 43 drives the cab 11 via the toothed ring 41. The corresponding toothed ring 59 on the crane mounting portion 53 coacting with the driving means 49 is not clearly shown on the drawing, but is of the same type as the toothed ring 41.

The invention may be applied to all types of working vehicles for the intended purpose, both waist articulated and otherwise. The basic vehicle shown on the drawings is of a particular type. By the cab 11 being situated on the intermediate section 3, in relation to which the forward section of the vehicle with the carrying wheels 13 can turn optionally about the shaft 7, the cab will not accompany such turning movements, which, when driving over very irregular terrain, can be considerable, as illustrated by FIG. 2. There is thus achieved a considerable increase in driver comfort when the machine is used in rough terrain.

In an arrangement in accordance with the invention, the cab and/or the crane may be rotationally disengagable relative each other so that they can be adjusted individually in optional angular positions. Means can be available here enabling fixing the cab in a predetermined angular attitude, which is suitable for a particular job, during which the crane is rotatable and operable as usual.

The invention is not limited to the shown and described embodiments, since these can be modified in different ways within the scope of the invention.

Since the cab in accordance with the invention is adapted for turning an angle $\alpha$, which is an optional function of the turning angle $\beta$ of the crane, it will be easily understood that turning these units can be provided by many different modes other than the ones mentioned above, all according to the kind of machine and the work to be executed.

We claim:

1. A wheeled vehicle, especially a forestry machine, comprising a driver's cab and a crane means intended for handling loads, within a working area, rotatably mounted on the vehicle about a substantially vertical axis, said driver's cab being rotatably mounted on the vehicle about a substantially vertical axis horizontally spaced from said rotational axis of the crane, means for rotational control to rotate the cab and the crane means about the horizontally spaced axes such that turning the crane an angle $\beta$ results in turning the cab an angle $\alpha$ in the same turning direction as the crane to allow an operator to maintain sight of the entire working area of said crane means within his field of view.

2. The vehicle of claim 1, in which $\alpha$ is less than $\beta$.

3. The vehicle of claim 1, in which $\alpha$ is greater than $\beta$.

4. The vehicle of claim 1, in which the rotational movement of the cab is controlled, such that $\alpha$ is approximately equal to $\beta/2$.

5. The vehicle of claim 1 or 4, in which the means for rotational control between the cab and crane is a chain transmission with the desired gear ratio.

6. The vehicle of claims 1 or 4, in which the means for rotational control between the cab and crane is a mechanical-hydraulic driving unit of the type including a pinion mounted on the rotatable unit co-acting with a rack actuated by a hydraulic cylinder-piston motor.

7. The vehicle of claim 6, in which the desired turning ratio between cab and crane is provided by correspondingly dimensioning the piston areas of cylinder-piston motors included in said driving units.

8. The vehicle of claims 1 or 4, which is of the waist articulated type comprising a forward section articulatedly connected to a rear section by a vertical articulation pin, and having the vertical turning axis of the cab coinciding with the axis of the vertical articulation pin.

9. The vehicle of claims 1 or 4, in which the cab is disengagable from the crane and adjustable to an optional angular attitude, in which the cab can be fixed relative to the vehicle chassis.

10. The vehicle of claims 1 or 4, in which the means for rotation between the cab and crane is driven by means of a mechanical-hydraulic driving unit of the type including a pinion mounted on the rotatable unit co-acting with a rack actuated by a hydraulic cylinder-piston motor.

* * * * *